(12) United States Patent
Ramsey (10) Patent No.: US 7,617,093 B2
(45) Date of Patent: Nov. 10, 2009

(54) AUTHORING SPEECH GRAMMARS (75) Inventor: William D. Ramsey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 538 days.

(21) Appl. No.: 11/143,357

(22) Filed: Jun. 2, 2005

(65) Prior Publication Data
US 2006/0277031 A1 Dec. 7, 2006

(51) Int. Cl.
G06T 1/20 (2006.01)
G09G 5/00 (2006.01)
G06F 17/21 (2006.01)
G06F 21/00 (2006.01)
H04M 15/00 (2006.01)

(52) U.S. Cl. .................. 704/10; 345/506; 345/619; 704/1; 704/9; 704/200; 704/231; 704/251; 705/34; 707/100; 709/202; 717/123; 717/124

(58) Field of Classification Search ............. 704/1–10, 704/200, 231, 240, 251–257, 270–272, 277; 345/506, 619; 705/34; 706/46; 707/1, 100; 709/202, 219; 717/123, 124, 143
See application file for complete search history.

(56) References Cited

U.S. PATENT DOCUMENTS 6,094,635 A * 7/2000 Scholz et al. ............... 704/270
6,317,707 B1 * 11/2001 Bangalore et al. ............. 704/9
6,374,209 B1 * 4/2002 Yoshimi et al. ................ 704/9
6,751,584 B2 * 6/2004 Bangalore et al. ............. 704/1
6,836,760 B1 * 12/2004 Bellegarda et al. .......... 704/257
6,865,528 B1 3/2005 Huang et al. .................. 704/9
7,031,907 B1 * 4/2006 Passaretti et al. .............. 704/2
2002/0032564 A1 * 3/2002 Ehsani et al. ............... 704/235
2002/0168664 A1 * 11/2002 Murray et al. ................ 435/6
2003/0121026 A1 * 6/2003 Wang et al. ................. 717/124
2003/0171929 A1 * 9/2003 Falcon et al. ................ 704/275
2004/0220809 A1 11/2004 Wang et al. ................. 704/257
2005/0154580 A1 * 7/2005 Horowitz et al. .............. 704/9

FOREIGN PATENT DOCUMENTS

EP 664535 A2 * 7/1995
EP 1100074 A1 * 5/2001

OTHER PUBLICATIONS

Brown et al. "Automatic Generation of Lexical and Grammatical Constraints for Speech Recognition", 1990 International Conference on Acoustics, Speech, and Signal Processing, 1990. ICASSP-90., Apr. 3-6, 1990, 733-736 vol. 2.*
Wang et al. "Grammar Learning for Spoken Language Understanding", IEEE Workshop On Automatic Speech Recognition and Understanding, 2001. ASRU '01, Dec. 9-13, 2001, 292-295.*

(Continued)

Primary Examiner—David R Hudspeth
Assistant Examiner—Justin W Rider
(74) Attorney, Agent, or Firm—Theodore M. Magee; Westman, Champlin & Kelly, P.A.

(57) ABSTRACT

A method and apparatus are provided for automatically forming a grammar. Example text strings are received and N-grams are formed based on the text strings. A rule in the grammar is then generated automatically based in part on the n-grams.

19 Claims, 6 Drawing Sheets

OTHER PUBLICATIONS

Wang et al., "A Unified Context-Free Grammar and N-Gram Model For Spoken Language Processing," Proceedings of ICASSP, Jun. 2000.

Chen, "An Empirical Study of Smoothing Techniques for Language Modeling," Proceedings of the 34$^{th}$ Annual Meeting of the Association for Computational Linguistics, 1996.

* cited by examiner

AUTHORING SPEECH GRAMMARS

BACKGROUND

In speech recognition, a speech signal is converted into a text string and in some systems a set of semantic tags that correspond to the semantic meaning of portions of the text string. To improve recognition accuracy, it is common to limit the recognizer to finding text strings that have been defined in a grammar.

An example of such a grammar is a context free grammar (CFG). In context free grammars, possible text sequences are defined as rules, where one rule may reference another rule. For example, the rule for setting up a meeting could be defined as "set up a meeting on <ruleref name="date">", where <ruleref name="date"> is a reference to a date rule that defines text strings that can represent a date.

While a CFG provides a straightforward structure for a grammar, it is difficult to construct an efficient CFG that provides high recognition accuracy. One reason for this is that in order to match a rule, the user must speak at least one of the word sequences anticipated by the author of the rule. To overcome this limitation, grammars have been developed that convert a context free grammar into an N-gram language model. The N-gram language model is constructed by identifying sequences of N words and/or rule references in the CFG and constructing a probability of each N-gram. Backoff probabilities for bigrams and unigrams can then be determined. Such grammars are often referred to as unified grammars and have the advantage that the user does not need to provide speech that exactly matches the sentences anticipated by the developer. Even if the user's speech includes words in a different order or omits certain words, the unified grammar can still provide a match.

Unified grammars are difficult for application developers to design. They require a large amount of knowledge in order to construct them well. In particular, the application developer must learn the scripting tags of the grammar format, understand how their construction of the CFG affects the ability of a unified grammar to identify speech, how to compute the backoff weights and how the grammar will interact with existing library grammars. This extra required knowledge represents a barrier to implementing speech recognition in everyday applications.

SUMMARY

A method and apparatus are provided for automatically forming a grammar. Example text strings are received and n-grams are formed based on the text strings. A rule in the grammar is then generated automatically based in part on the n-grams.

DETAILED DESCRIPTION OF ILLUSTRATIVE EMBODIMENTS

Figure 1:
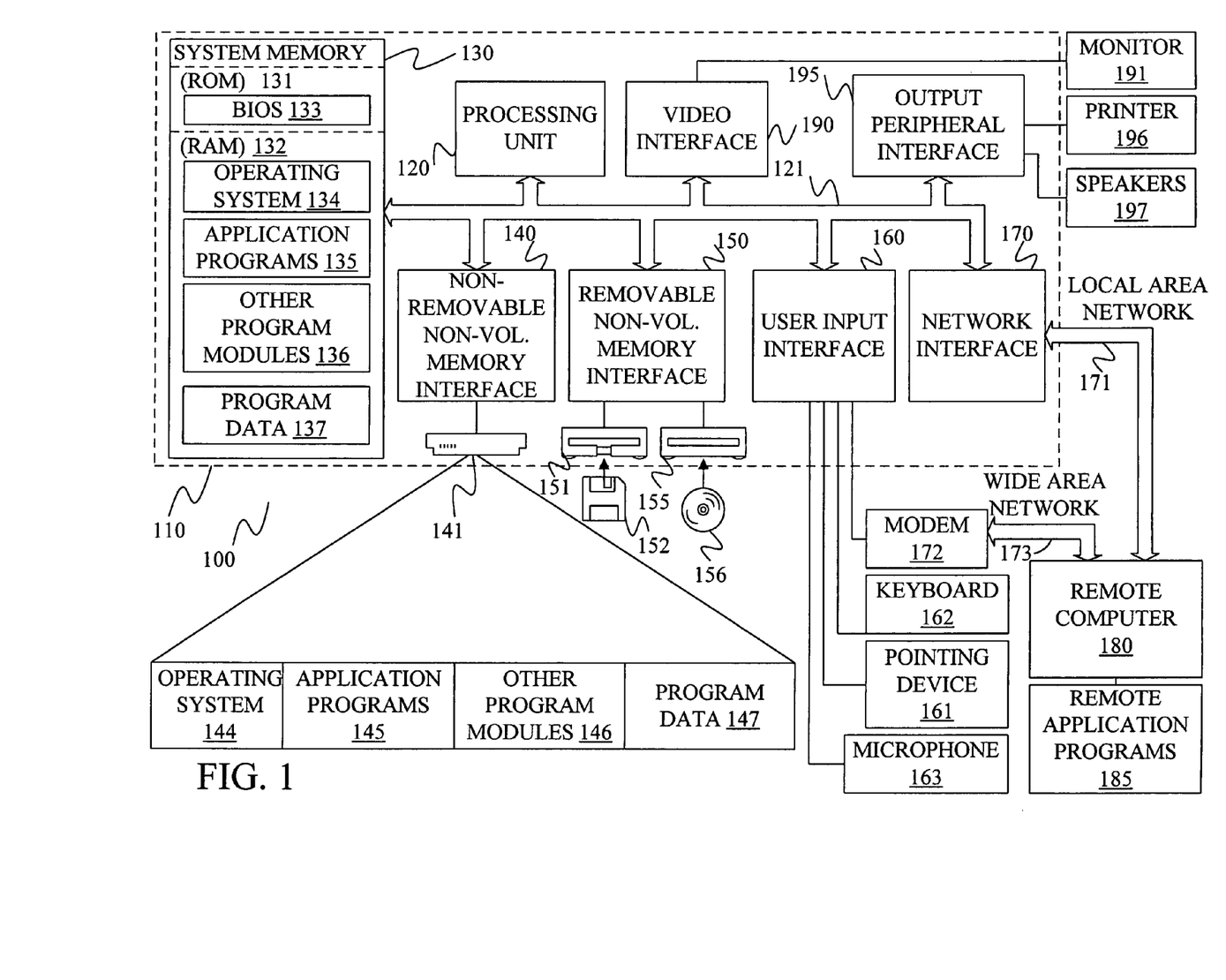
FIG. 1 is a block diagram of one computing environment in which embodiments of the present invention may be practiced.

FIG. 1 illustrates an example of a suitable computing system environment 100 on which embodiments of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments of the invention are operational with numerous other general purpose or special purpose computing systems environments or configurations. Examples of well-known computing systems, environments, and/or configurations that may be suitable for use with embodiments of the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments of the invention may be described in the general context of computer-executable instructions, such as program modules, being executed by a computer. Generally, program modules include routines, programs, objects, components, data structures, etc. that perform particular tasks or implement particular abstract data types. Embodiments of the invention are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing embodiments of the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
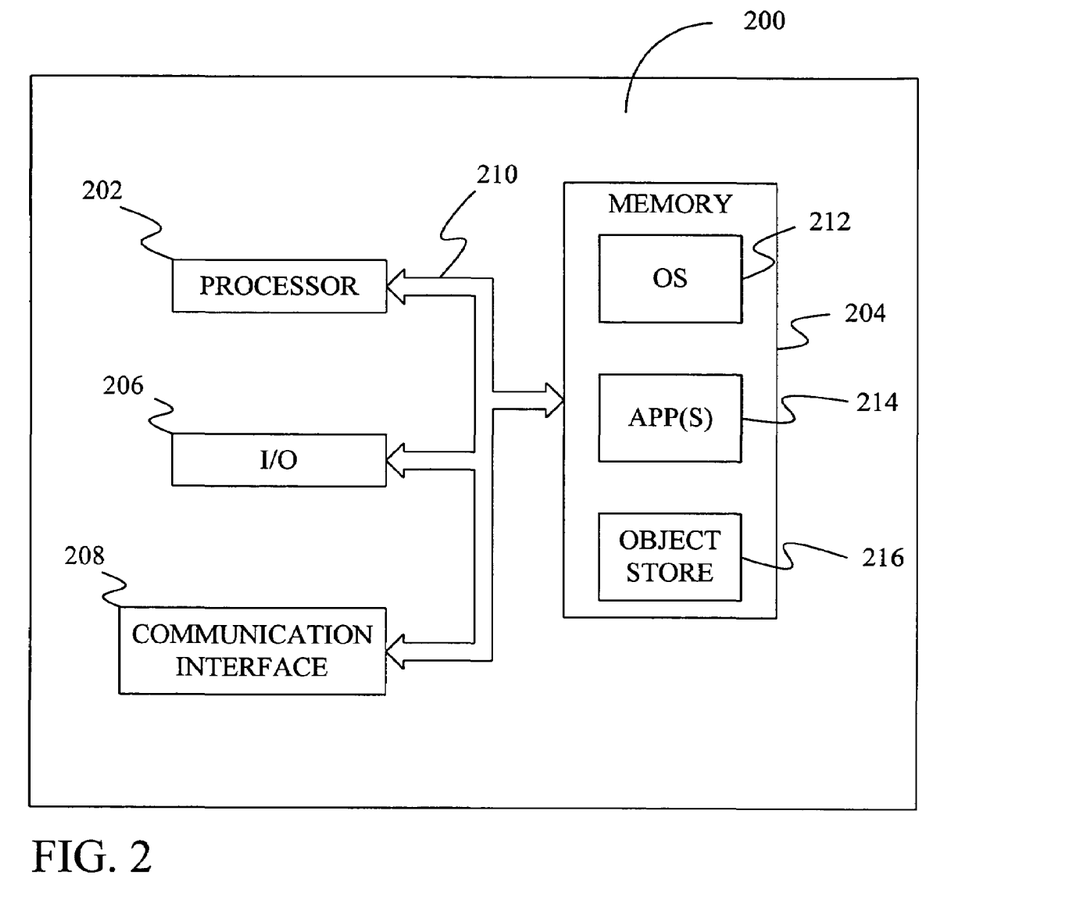
FIG. 2 is a block diagram of an alternative computing environment in which embodiments of the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as ea variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
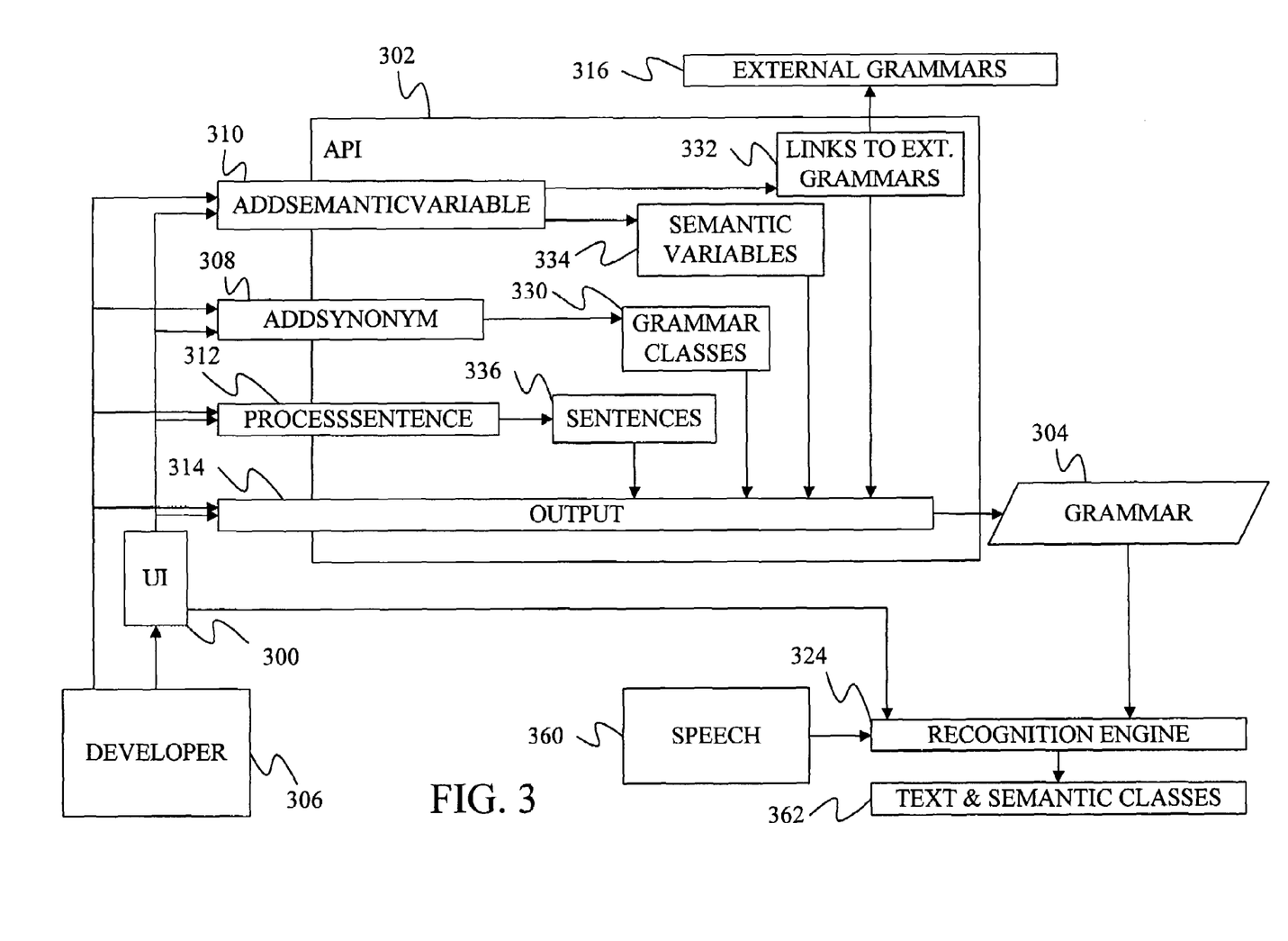
FIG. 3 is a block diagram of elements used to construct a grammar under embodiments of the present invention.

Embodiments of the present invention provides a user interface 300 and an application programming interface (API) 302 that enable speech grammars 304 to be constructed automatically based on information provided by an application developer 306. API 302 provides an interface that includes an AddSynonym method 308, AddSemanticVariable method 310, ProcessSentence method 312 and Output method 314.

AddSynonym method 308 allows developer 306 to associate a word or a string of words with a semantic class. Multiple words or strings of words may be associated with the same semantic class by using separate calls to AddSynonym method 308.

Under one embodiment, a call to AddSynonym method 308 is made with the following arguments:

AddSynonym (string synonym, string Semantic_Class, double weight, bool isIndicator) where "synonym" is the word or word string to be assigned to the semantic class, "Semantic_Class" is the semantic class, "weight" is a relative weight that should be assigned to the word within the semantic class, and "isIndicator" indicates whether the semantic class acts as an indicator for other semantic classes. An indicator class is a semantic class that further defines the semantic class that follows it. For example, a class of "source" can be an indicator class that indicates the type of a "city" class that follows it. Thus, in the sentence "I want to fly from Seattle", the word "from" can be a member of the "source" class which is an indicator for the word "Seattle" which is a member of the "city" class. Thus, using the indicator, "Seattle" is defined as a "source city".

The AddSemanticVariable method allows the developer to specify how semantic variables are used, which can improve the construction of the underlying grammar. In the method call, the developer specifies the following:

AddSemanticVariable(string Main_Semantic_Class, string Indicator_Semantic_Class, bool isActive)

where Main_Semantic_Class indicates a semantic class for the current grammar or a reference to a semantic class stored in an external grammar such as external grammars 316. The reference to an external grammar will include the name of the external grammar and the name of the rule for the semantic class in the external grammar. The Indicator_Semantic_Class indicates a second semantic class that is combined with the main semantic class to form a hybrid class when the indicator semantic class is found next to and before the main semantic class. For example, if "City" is a main semantic class and "goal" is an indicator semantic class, when the "goal" semantic class precedes the "city" semantic class, the two semantic classes will be combined to form a single "goal city" semantic class. The "is Active" value indicates whether this hybrid class should be used instead of the main semantic class when the main semantic class appears without an indicator class next to it.

ProcessSentence method 312 allows the developer to provide example sentences that are expected to be received from the user. Each call to the method is made as follows:

ProcessSentence(string sentence, double weight)

where "sentence" is one or more words and "weight" indicates the likelihood of the sentence occurring.

Output method 314 allows the developer to designate an output file and output format for the grammar. The method call is made as:

Output(string filename, string grammarType)

where "filename" is the name and path of the file that will contain the grammar, and "grammarType" is the output format for the grammar such as SAPI5.0, SAPI6.0, and GRXML. Calling this method causes API 302 to produce grammar 304 based on the sentences and semantic classes that were received through the AddSynonym, AddSemanticVariable and ProcessSentence methods.

Figure 5:
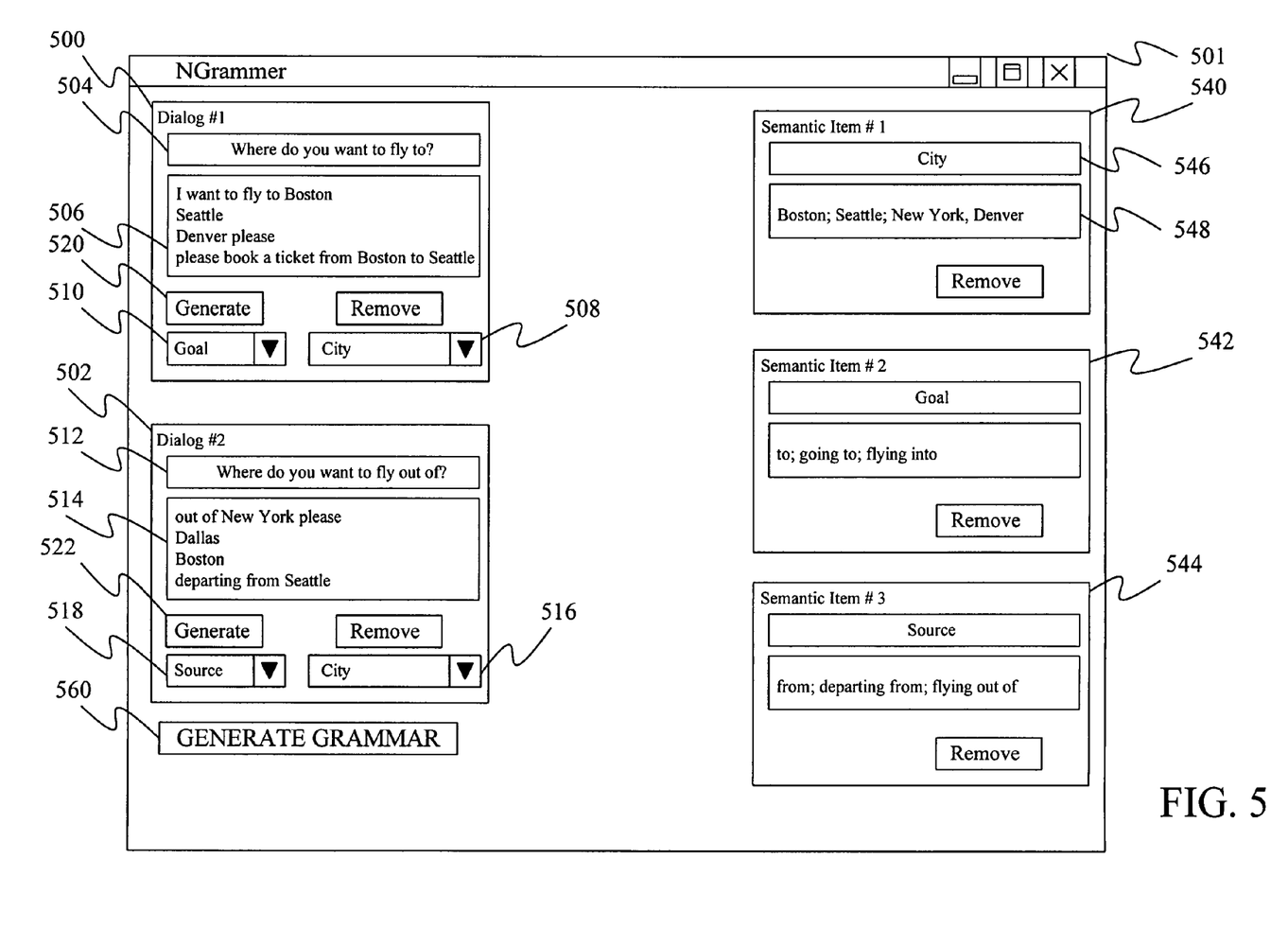
FIG. 5 is an example screen shot of a user interface under one embodiment of the present invention.

The methods of API 302 may be called directly by developer 306 or indirectly using user interface (UI) 300. FIG. 5 provides a screen shot of one embodiment of a user interface under the present invention.

In FIG. 5, two dialog boxes 500 and 502 are provided in an application window 501. Dialog box 500 includes system question box 504 and response box 506. The developer inserts the question that is to be posed by the system during the dialog turn associated with dialog box 500 in system question box 504. The developer then lists possible responses that the user may provide in response box 506. Main semantic class pull-down box 508 and indicator semantic class pull-down box 510 are also provided in dialog box 500. The developer sets values in these boxes to indicate a default semantic class or hybrid semantic class that the responses in response box 506 should be associated with if no other semantic class can be associated with the input. For example, in box 500, the responses by the user will default to being associated with the hybrid semantic class "Goal_City".

Similarly, dialog box 502 includes system question box 512, response box 514, main semantic class pull-down box 516 and indicator semantic class pull-down box 518.

Generate buttons 520 and 522 of dialog boxes 500 and 502, respectively, cause the respective sentence lists in the dialog boxes to be submitted through the use of the ProcessSentence method, where each sentence is submitted with a separate ProcessSentence method call.

The interface of FIG. 5 also includes three semantic class definition boxes 540, 542 and 544. Each semantic class box includes a semantic class name box and a terminal list box. For example, semantic class box 540 includes semantic class name box 546 and terminal list box 548. The developer places the name of the semantic class in semantic class name box 546 and lists the strings that are to be associated with that semantic class in terminal list box 548. Thus, the strings Boston, Seattle, New York and Denver are the terminal nodes for the semantic class CITY.

The user interface of FIG. 5 also includes a generate button 560 that executes code when the button is activated to cause the grammar to be generated based on the sentences and semantic information provided through the user interface. This is performed by using the Output method of API 302 to generate grammar 304. User interface 300 then issues a command to speech recognition engine 324 to load grammar 304 into recognition engine 324 for speech recognition.

Speech recognition engine 324 uses the loaded grammar to decode speech signals 360 into text and semantic classes 362 by converting the speech signal into feature vectors and applying the feature vectors to acoustic models of the words in the grammar. The words and semantic classes along the most likely path through the rules defined in the grammar are returned as text and semantic classes 362. As those skilled in the art will recognize, speech recognition engine 324 will often compile the grammar into a binary format when it is loaded.

Figure 4:
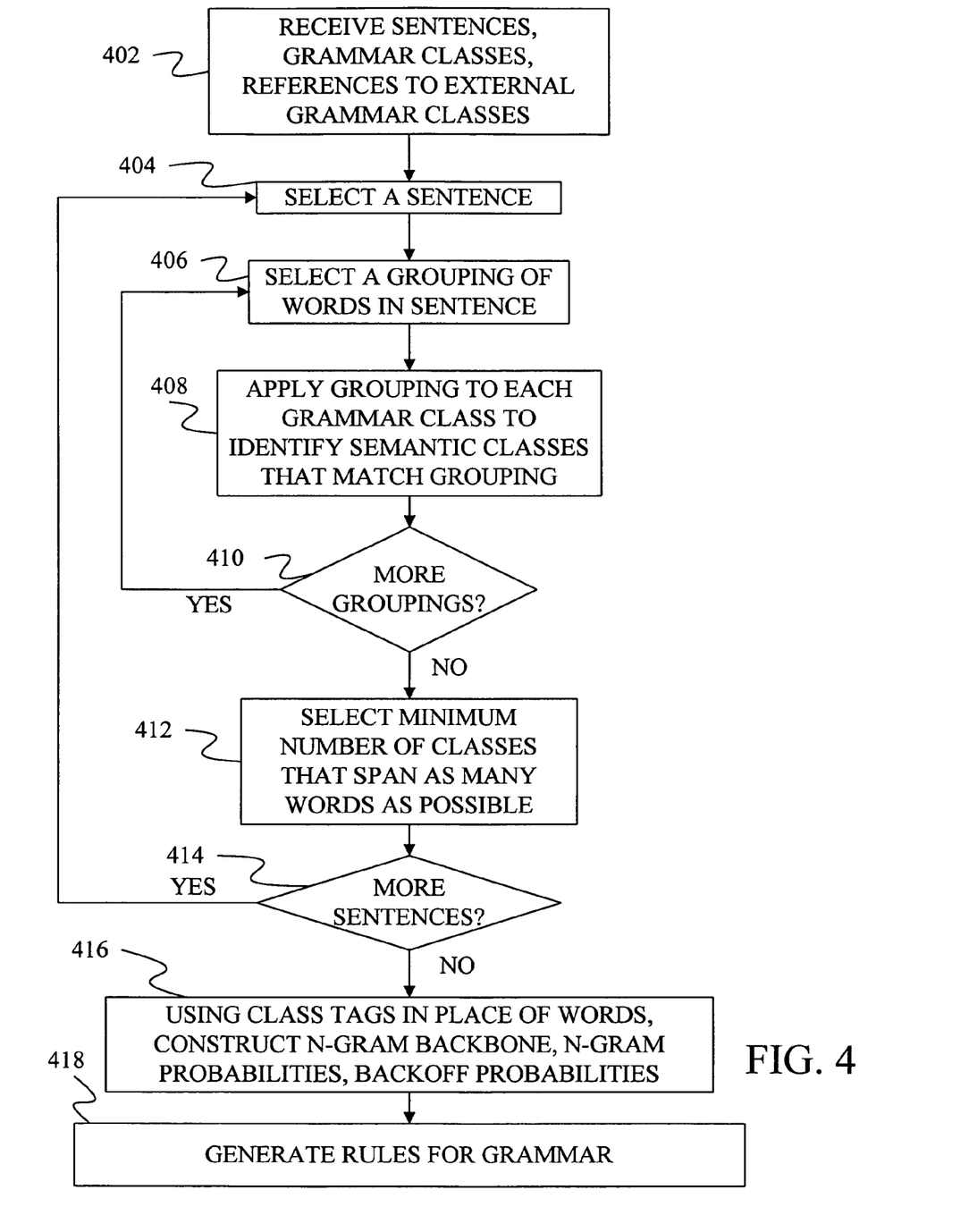
FIG. 4 is a flow diagram of steps performed to construct a grammar under an embodiment of the present invention.

FIG. 4 provides a flow diagram of a method of automatically constructing a grammar that is performed by API 302. In step 402, API 302 receives the sentences, semantic variable definitions, semantic class listings and references to other grammar rules from the developer. As shown in FIG. 3, this results in grammar classes 330, which are produced by the AddSynonym method 308, semantic variables 334 and links to external grammar classes 332, which are produced by the AddSemanticVariable method 310, and sentences 336, which are produced by the ProcessSentence method 312.

At step 404 of FIG. 4, output method 314 selects one of the sentences from sentences 336 and at step 406 selects a grouping of words from the sentence. At step 408, the selected grouping is applied to each of the grammar classes, including external grammar classes, that were listed using the AddSynonym method. Applying a grouping involves determining if the grouping exactly matches one of the text strings that are listed for the semantic class. If a grammar class is found that has a text string that exactly matches the grouping, the grammar class and the span of the grouping are stored.

At step 410, the method determines if there are other groupings of words that can be formed for the sentence. If there is another grouping of words that can be formed, the next grouping of words is selected at step 406 and this grouping is then applied to each of the grammar classes to identifying semantic classes that match the grouping. Steps 406, 408 and 410 are repeated until every possible grouping of contiguous words in the sentence, including individual words, has been applied against the grammar classes.

After there are no more groupings at step 410, the process continues at step 412 where the minimum number of classes that span as many words as possible is selected. Thus, different combinations of classes are examined to find the combination of classes that spans as many words as possible in the sentence. If more than one combination of classes spans the same number of words, the set of classes that has the minimum number of classes is selected.

At step 414, if there are more sentences in sentences 336, the next sentence is selected at step 404 and steps 406, 408, 410 and 412 are repeated for the new sentence.

When all of the sentences in sentences 336 have been processed, the method continues at step 416 where tags for the classes are used in place of the words that the classes span in each of the sentences to form modified sentences. For example, the sentence "Flight to Seattle" would become "Flight to <City>". An N-gram backbone is then produced by grouping the class tags and words that were not replaced by class tags into n-grams of various orders (unigrams, bigrams, etc. up to N-grams), where the order of an n-gram is the number of words n in the n-gram. For example, the sentence "I want to fly to Boston" where Boston is in the semantic class <City> results in the identification of unigrams "I", "want", "to", "fly", "<City>", bigrams "I want", "want to", "to fly", "fly to", "to <City>", and trigrams "I want to", "want to fly", "to fly to", "fly to <City>". In addition, words and classes that can start a sentence or end a sentence are identified.

For each specific n-gram, such as the bigram "fly to" or the trigram "want to fly", a probability is calculated by counting the number of times the n-gram appears in the sentences and dividing that count by the number of times that the history portion of the n-gram appears in the sentences, where the history portion consists of the first n−1 words or classes of the n-gram. In addition, backoff probabilities are calculated by smoothing the n-gram probabilities to provide at least some probability for unseen n-grams. Such smoothing techniques are well known in the art and can include Katz smoothing or Good-Turing smoothing.

For each semantic class, the probability of each word string associated with the class is determined from the sentences. In one particular embodiment, the probability is determined by dividing the number of times the word string appears in the sentences by the number of times any word string in the class appears in the sentences.

Figure 6:
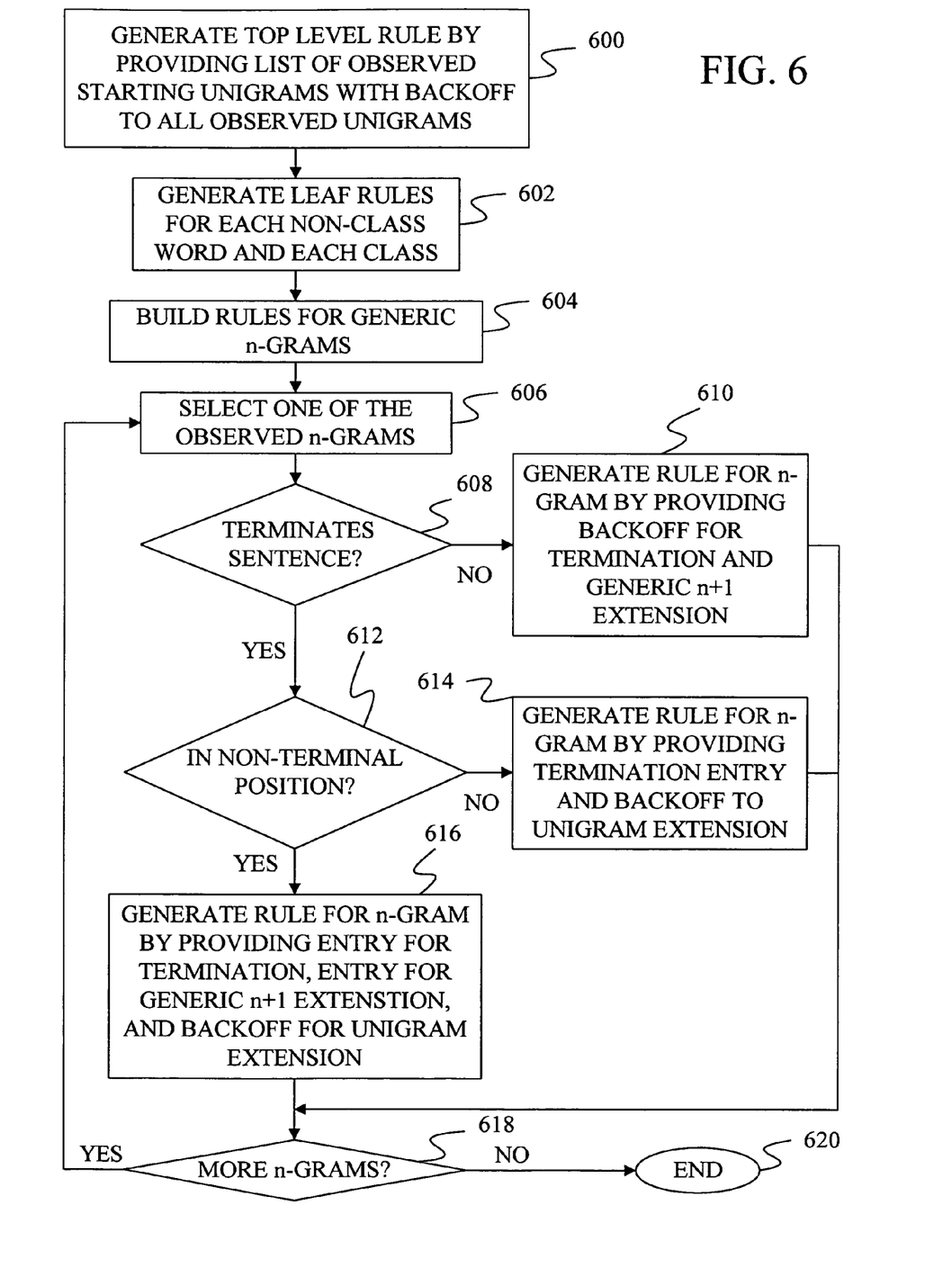
FIG. 6 is a flow diagram of a method of converting an N-gram backbone into an output grammar format under one embodiment of the present invention.

At step 418, the N-gram backbone and the probabilities are used to generate grammar rules in the chosen grammar format set through the Output method. FIG. 6 provides a flow diagram of one method for generating the output grammar from the N-gram backbone and the probabilities. The method of FIG. 6 is discussed below with reference to an example output grammar shown below. The example grammar was constructed for the sentences:

"I want to fly to Boston"

"Seattle"

"Denver please"

"please book a ticket from Boston to Seattle"

where Seattle, Boston, and Denver are members of the class <CLASSDEF_CITY>.

The grammar is written in SAPI6.0 format and has a set of outer <Grammar> tags that define the grammar and provide an identifier for the grammar. Each rule of the grammar is defined between <Rule> tags that have a Name attribute that identifies the rule. <List> tags are used to designate sets of alternative paths through the rule, with each path being defined between <P> tags. Each path has an associated weight attribute that indicates the probability of following the path given the rule. Within a path, other rules are referenced using a <Ruleref> tag with the NAME attribute set to the name of the rule. Sequences of individual words or <Ruleref> tags form the paths within the path <P> tags.

In step 600 of FIG. 6, a top level rule is generated that represents the possible beginning of a sentence. An example of such a top level rule is shown below as "SENTENCE_TOP_NODE" rule. The rule is designated as being the top level rule by setting the TOPLEVEL attribute to ACTIVE. The top level rule consists of a list of unigrams that were observed at the beginning of the sentence and a backoff option for any unigram in the sentences. The backoff option is given a small probability and the remaining probability is divided among the observed unigrams based on the number of times each unigram appears at the start of a sentence. For example, in the rule "SENTENCE_TOP_NODE" below, 0.0005 of the probability mass has been assigned to the backoff. The remaining 0.9995 has been divided among the unigrams for "I", "CLASSDEF_CITY", and "please". Since "CLASSDEF_CITY" appears at the beginning of two sentences and "I" and "please" each appear at the beginning of one sentence, the 0.9995 probability mass is divided into four parts, with one part (0.2498) being assigned to "I", one part (0.2498)

being assigned to "please" and two parts (0.4996) being assigned to "CLASSDEF_CITY".

At step 602, leaf node rules are written for each class and each word that is not assigned to a class. A leaf rule for a class lists all of the text strings that were assigned to the class using the AddSynonym method. Each string is placed within separate <p> tags and assigned a weight that is determined by dividing the number of times the text string appeared in the sentences by the number of times any text string of the class appeared in the sentences. Leaf rules for words, contain the text string for the word with a weight of 1.000.

At step 604, a generic rule to cover all unigrams and generic rules for n-grams (bigrams to N-grams) are constructed. The generic rule for the unigrams provides a list of all possible unigrams, with each unigram receiving a weight that is equal to the probability of the word or class appearing in the sentences. The generic rules for the n-grams consists of a separate rule for each n−1 history portion of each n-gram. For example, for the bigrams "to fly" and "to Boston", a generic bigram rule is created as "To_Bigram" for the history "to". Each generic rule for the n-grams provides a list of specific n-grams of the same order with the same n−1 history in the sentences and a backoff to all unigrams. The probability of specific n-grams is determined by dividing the non-backoff probability among the specific n-grams according to how often each specific n-gram is observed in the sentences. Examples of generic bigrams can be found below in rules such as "I_BIGRAMS" and "WANT_BIGRAMS". Examples of generic trigrams can be found below in rules such as "I_WANT_TRIGRAMS" and "BOOK_A_TRIGRAMS".

At step 606, one of the observed n-grams (unigram to N-gram) is selected. At step 608, the n-gram's position in the sentences is examined to determine if it ever ends a sentence. If it does not end a sentence, a rule is generated for the specific n-gram at step 610. In the rule, an entry is provided that references the last word or class of the n-gram followed by a generic extension of the n-gram. For n-grams less than order N, the generic extension is an n+1 extension. For example, in the grammar below, rule "WANT_TO" was generated for the specific bigram "want to". In the rule, a path is defined that includes a reference to the leaf rule for "to" by a reference to the generic trigram "WANT_TO_TRIGRAMS". For N-grams, the extension is of order N. Thus, a specific trigram will include an entry consisting of a reference to the leaf of the last word or class in the N-gram followed by a reference to a generic N-gram that starts with the last N−1 words or classes of the current N-gram.

The rule constructed at step 610 also includes a backoff entry for the last word or class of the n-gram occurring at the end of the utterance. This backoff entry is given a low probability and is written as a reference to the leaf rule of the last word or class of the n-gram.

If the selected n-gram does appear at the end of at least one sentence, the process continues at step 612 where the n-gram's positions are examined to determine if it ever occurs in a position other than at the end of a sentence. If it does not appear at a position other than the end of a sentence, the process generates a rule for the n-gram at step 614. The rule generated at step 614 includes a termination entry that references the leaf rule for the last word or class in the n-gram and a low probability backoff entry that references the leaf rule of for the last word of the n-gram followed by a reference to the generic unigram rule. For n-grams of greater order than a unigram, the backoff entry can instead take the form of a reference to the unigram rule for the last word of the n-gram.

If the selected n-gram appears at both the end of a sentence and a position other than the end of a sentence, the process generates a rule for the n-gram at step 616. The rule generated at step 616 includes a backoff entry that includes a reference to the leaf rule of the last word or class in the n-gram followed by a reference to the generic unigram rule. The probability that is not assigned to the backoff probability is split between an entry for the n-gram being in the last position of the sentence and an entry for a generic extension of n-gram. The entry for the last position in a sentence includes a reference to the leaf rule of the last word or class of the n-gram. The entry for the generic extension is similar to the generic extensions discussed above for step 610. The non-backoff probability is divided between the entry for n-gram ending an utterance and the entry for the generic extension by counting how often the n-gram ends a sentence and dividing the count by the number of times the n-gram is observed.

After a rule has been constructed for the selected n-gram at step 610, 614 or 616, the process continues at step 618 where it determines if there are more n-grams in the N-gram backbone to be processed. If there are more n-grams, the next n-gram gram is selected by returning to step 606. Steps 606, 608, 610, 612, 614, 616, and 618 are repeated until all of the n-grams have had rules constructed for them. The process then ends at step 620.

Example Grammar
```
<GRAMMAR LANGID="409">
  <RULE      NAME="SENTENCE_TOP_NODE"
    TOPLEVEL="ACTIVE">
    <LIST>
      <!--OUTPUT UNIGRAMS THAT STARTED SEN-
        TENCES->
      <P WEIGHT="0.2498">
        <RULEREF NAME="I"/>
      </P>
      <P WEIGHT="0.4996">
        <RULEREF NAME="CLASSDEF_CITY"/>
      </P>
      <P WEIGHT="0.2494">
        <RULEREF NAME="please"/>
      </P>
      <!--BACKOFF TO UNIGRAMS-->
      <P WEIGHT="0.0005">
        <RULEREF NAME="UNIGRAMS"/>
      </P>
    </LIST>
  </RULE>
  <RULE NAME="UNIGRAMS">
    <LIST>
      <P WEIGHT="0.05882">
        <RULEREF NAME="I"/>
      </P>
      <P WEIGHT="0.05882">
        <RULEREF NAME="want"/>
      </P>
      <P WEIGHT="0.17647">
        <RULEREF NAME="TO"/>
      </P>
      <P WEIGHT="0.05882">
        <RULEREF NAME="fly"/>
      </P>
      <P WEIGHT="0.29412">
        <RULEREF NAME="CLASSDEF_CITY"/>
      </P>
      <P WEIGHT="0.11765">
        <RULEREF NAME="please"/>
```

```
      </P>
      <P WEIGHT="0.05882">
         <RULEREF NAME="BOOK"/>
      </P>
      <P WEIGHT="0.05882">
         <RULEREF NAME="A"/>
      </P>
      <P WEIGHT="0.05882">
         <RULEREF NAME="TICKET"/>
      </P>
      <P WEIGHT="0.05882">
         <RULEREF NAME="FROM"/>
      </P>
   </LIST>
</RULE>
<!---Leaf Rules>
<RULE NAME="I_LEAF">
   <LIST>
      <!---CLASS SYNONYMS-->
      <P WEIGHT="1.0000">I</P>
   </LIST>
<RULE>
<RULE NAME="CLASSDEF_CITY_LEAF">
   <LIST>
      <!--CLASS SYNONYMS-->
      <P WEIGHT="0.4000">boston</P>
      <P WEIGHT="0.4000">seattle</P>
      <P WEIGHT="0.2000">denver</P>
   </LIST>
</RULE>
<RULE NAME="PLEASE_LEAF">
   <LIST>
      <!--CLASS SYNONYMS-->
      <P WEIGHT="1.0000">please</P>
   </LIST>
</RULE>
<RULE NAME="WANT_LEAF">
   <LIST>
      <!--CLASS SYNONYMS-->
      <P WEIGHT="1.0000">want</P>
   </LIST>
</RULE>
<RULE NAME="TO_LEAF">
   <LIST>
      <!--CLASS SYNONYMS-->
      <P WEIGHT="1.0000">to</P>
   </LIST>
</RULE>
<RULE NAME="FLY LEAF">
   <LIST>
      <!--CLASS SYNONYMS-->
      <P WEIGHT="1.0000">fly</P>
   </LIST>
</RULE>
<RULE NAME="BOOK_LEAF">
   <LIST>
      <!--CLASS SYNONYMS-->
      <P WEIGHT="1.0000">book</P>
   </LIST>
</RULE>
<RULE NAME="A LEAF">
   <LIST>
      <!--CLASS SYNONYMS-->
      <P WEIGHT="1.0000">a</P>
   </LIST>
</RULE>
<RULE NAME="TICKET_LEAF">
   <LIST>
      <!--CLASS SYNONYMS-->
      <P WEIGHT="1.0000">ticket</P>
   </LIST>
</RULE>
<RULE NAME="FROM_LEAF">
   <LIST>
      <!--CLASS SYNONYMS-->
      <P WEIGHT="1.0000">from</P>
   </LIST>
</RULE
<!---Unigram rules--->
<RULE NAME="I">
   <LIST>
      <!--ALLOW TERMINATION HERE-->
      <P WEIGHT="0.0010">
         <RULEREF NAME="I_LEAF"/>
      </P>
      <!--GO TO BIGRAMS-->
      <P WEIGHT="0.9990">
         <RULEREF NAME="I_LEAF"/>
         <RULEREF NAME="I_BIGRAMS"/>
      </P>
   </LIST>
</RULE>
<RULE NAME="CLASSDEF_CITY">
   <LIST>
      <!--ALLOW TERMINATION HERE-->
      <P WEIGHT="0.5994">
         <RULEREF
            NAME="CLASSDEF_CITY_LEAF"/>
      </P>
      <!--GO TO BIGRAMS-->
      <P WEIGHT="0.3996">
         <RULEREF
            NAME="CLASSDEF_CITY_LEAF"/>
         <RULEREF
            NAME="CLASSDEF_CITY_BIGRAMS"/>
      </P>
      <!--BACKOFF TO UNIGRAMS-->
      <P WEIGHT="0.0010">
         <RULEREF
            NAME="CLASSDEF_CITY_LEAF"/>
         <RULEREF NAME="UNIGRAMS"/>
      </P>
   </LIST>
</RULE>
<RULE NAME="please">
   <LIST>
      <!--ALLOW TERMINATION HERE-->
      <P WEIGHT="0.4995">
         <RULEREF NAME="Please_LEAF"/>
      </P>
      <!--GO TO BIGRAMS-->
      <P WEIGHT="0.4995">
         <RULEREF NAME="Please_LEAF"/>
         <RULEREF NAME="Please_BIGRAMS"/>
      </P>
      <!--BACKOFF TO UNIGRAMS-->
      <P WEIGHT="0.001">
         <RULEREF NAME="Please_LEAF"/>
         <RULEREF NAME="UNIGRAMS"/>
      </P>
   </LIST>
</RULE>
<RULE NAME="WANT">
   <LIST>
```

```
      <!--ALLOW TERMINATION HERE-->
      <P WEIGHT="0.0010">
        <RULEREF NAME="WANT_LEAF"/>
      </P>
      <!--GO TO BIGRAMS-->
      <P WEIGHT="0.9990">
        <RULEREF NAME="WANT_LEAF"/>
        <RULEREF NAME="WANT_BIGRAMS"/>
      </P>
    </LIST>
  </RULE>
  <RULE NAME="TO">
    <LIST>
      <!--ALLOW TERMINATION HERE-->
      <P WEIGHT="0.001">
        <RULEREF NAME="TO_LEAF"/>
      </P>
      <!--GO TO BIGRAMS-->
      <P WEIGHT="0.9990">
        <RULEREF NAME="TO_LEAF"/>
        <RULEREF NAME="TO_BIGRAMS"/>
      </P>
    </LIST>
  </RULE>
  <RULE NAME="FLY">
    <LIST>
      <!--ALLOW TERMINATION HERE-->
      <P WEIGHT="0.0010">
        <RULEREF NAME="FLY_LEAF"/>
      </P>
      <!--GO TO BIGRAMS-->
      <P WEIGHT="0.9990">
        <RULEREF NAME="FLY_LEAF"/>
        <RULEREF NAME="FLY_BIGRAMS"/>
      </P>
    </LIST>
  </RULE>
  <RULE NAME="BOOK">
    <LIST>
      <!--ALLOW TERMINATION HERE-->
      <P WEIGHT="0.001">
        <RULEREF NAME="BOOK_LEAF"/>
      </P>
      <!--GO TO BIGRAMS-->
      <P WEIGHT="0.9990">
        <RULEREF NAME="BOOK_LEAF"/>
        <RULEREF NAME="BOOK_BIGRAMS"/>
      </P>
    </LIST>
  </RULE>
  <RULE NAME="A">
    <LIST>
      <!--ALLOW TERMINATION HERE-->
      <P WEIGHT="0.0010">
        <RULEREF NAME="A_LEAF"/>
      </P>
      <!--GO TO BIGRAMS-->
      <P WEIGHT="0.9990">
        <RULEREF NAME="A_LEAF"/>
        <RULEREF NAME="A_BIGRAMS"/>
      </P>
    </LIST>
  </RULE>
  <RULE NAME="TICKET">
    <LIST>
      <!--ALLOW TERMINATION HERE-->
      <P WEIGHT="0.0010">
        <RULEREF NAME="TICKET_LEAF"/>
      </P>
      <!--GO TO BIGRAMS-->
      <P WEIGHT="0.9990">
        <RULEREF NAME="TICKET_LEAF"/>
        <RULEREF NAME="TICKET_BIGRAMS"/>
      </P>
    </LIST>
  </RULE>
  <RULE NAME="FROM">
    <LIST>
      <!--ALLOW TERMINATION HERE-->
      <P WEIGHT="0.0010">
        <RULEREF NAME="FROM_LEAF"/>
      </P>
      <!--GO TO BIGRAMS-->
      <P WEIGHT="0.9990">
        <RULEREF NAME="FROM_LEAF"/>
        <RULEREF NAME="FROM_BIGRAMS"/>
      </P>
    </LIST>
  </RULE>
<!--Bigram Rules>
  <RULE NAME="I_BIGRAMS">
    <LIST>
      <!--BIGRAMS THAT WERE SEEN-->
      <P WEIGHT="0.8000">
        <RULEREF NAME="I_WANT"/>
      </P>
      <!--BACKOFF TO UNIGRAMS-->
      <P WEIGHT="0.2000">
        <RULEREF NAME="UNIGRAMS"/>
      </P>
    </LIST>
  </RULE>
  <RULE NAME="I_WANT">
    <LIST>
      <!--ALLOW TERMINATION AT THIS BIG-
      RAM-->
      <P WEIGHT="0.0050">
        <RULEREF NAME="WANT_LEAF"/>
      </P>
      <!--GO TO TRIGRAMS-->
      <P WEIGHT="0.9950">
        <RULEREF NAME="WANT_LEAF"/>
        <RULEREF NAME="I_WANT_TRIGRAMS"/>
      </P>
    </LIST>
  </RULE>
  <RULE NAME="WANT_BIGPAMS">
    <LIST>
      <!--BIGRAMS THAT WERE SEEN-->
      <P WEIGHT="0.8000">
        <RULEREF NAME="WANT_TO"/>
      </P>
      <!--BACKOFF TO UNIGRAMS-->
      <P WEIGHT="0.2000">
        <RULEREF NAME="UNIGRAMS"/>
      </P>
    </LIST>
  </RULE>
  <RULE NAME="WANT_TO">
    <LIST>
      <!--ALLOW TERMINATION AT THIS BIG-
      RAM-->
      <P WEIGHT="0.0050">
        <RULEREF NAME="TO_LEAF"/>
```

```xml
    </P>
    <!--GO TO TRIGRAMS-->
    <P WEIGHT="0.9950">
      <RULEREF NAME="TO_LEAF"/>
      <RULEREF
        NAME="WANT_TO_TRIGRAMS"/>
    </P>
  </LIST>
</RULE>
<RULE NAME="TO_BIGRAMS">
  <LIST>
    <!--BIGRAMS THAT WERE SEEN-->
    <P WEIGHT="0.2667">
      <RULEREF NAME="TO_FLY"/>
    </P>
    <P WEIGHT="0.5333">
      <RULEREF NAME="TO_CLASSDEF_CITY"/>
    </P>
    <!--BACKOFF TO UNIGRAMS-->
    <P WEIGHT="0.2000">
      <RULEREF NAME="UNIGRAMS"/>
    </P>
  </LIST>
</RULE>
<RULE NAME="TO_FLY">
  <LIST>
    <!--ALLOW TERMINATION AT THIS BIGRAM-->
    <P WEIGHT="0.0050">
      <RULEREF NAME="FLY_LEAF"/>
    </P>
    <!--GO TO TRIGRAMS-->
    <P WEIGHT="0.9950">
      <RULEREF NAME="FLY_LEAF"/>
      <RULEREF NAME="TO_FLY_TRIGRAMS"/>
    </P>
  </LIST>
</RULE>
<RULE NAME="TO_CLASSDEF_CITY">
  <LIST>
    <!--GO TO UNIGRAM-->
    <P WEIGHT="1.0000">
      <RULEREF NAME="CLASSDEF_CITY"/>
    </P>
  </LIST>
</RULE>
<RULE NAME="FLY_BIGRAMS">
  <LIST>
    <!--BIGRAMS THAT WERE SEEN-->
    <P WEIGHT="0.8000">
      <RULEREF NAME="FLY_TO"/>
    </P>
    <!--BACKOFF TO UNIGRAMS-->
    <P WEIGHT="0.2000">
      <RULEREF NAME="UNIGRAMS"/>
    </P>
  </LIST>
</RULE>
<RULE NAME="FLY_TO">
  <LIST>
    <!--ALLOW TERMINATION AT THIS BIGRAM-->
    <P WEIGHT="0.0050">
      <RULEREF NAME="TO_LEAF"/>
    </P>
    <!--GO TO TRIGRAMS-->
    <P WEIGHT="0.9950">
      <RULEREF NAME="TO_LEAF"/>
      <RULEREF NAME="FLY_TO_TRIGRAMS"/>
    </P>
  </LIST>
</RULE>
<RULE NAME="CLASSDEF_CITY_BIGRAMS">
  <LIST>
    <!--BIGRAMS THAT WERE SEEN-->
    <P WEIGHT="0.4000">
      <RULEREF
        NAME="CLASSDEF_CITY_PLEASE"/>
    </P>
    <P WEIGHT="0.4000">
      <RULEREF NAME="CLASSDEF_CITY_TO"/>
    </P>
    <!--BACKOFF TO UNIGRAMS-->
    <P WEIGHT="0.2000">
      <RULEREF NAME="UNIGRAMS"/>
    </P>
  </LIST>
</RULE>
<RULE NAME="CLASSDEF_CITY_PLEASE">
  <LIST>
    <!--GO TO UNIGRAM-->
    <P WEIGHT="1.0000">
      <RULEREF NAME="PLEASE"/>
    </P>
  </LIST>
</RULE>
<RULE NAME="CLASSDEF_CITY_TO">
  <LIST>
    <!--ALLOW TERMINATION AT THIS BIGRAM-->
    <P WEIGHT="0.0050">
      <RULEREF NAME="TO_LEAF"/>
    </P>
    <!--GO TO TRIGRAMS-->
    <P WEIGHT="0.9950">
      <RULEREF NAME="TO_LEAF"/>
      <RULEREF
        NAME="CLASSDEF_CITY_TO_TRIGRAMS"/>
    </P>
  </LIST>
</RULE>
<RULE NAME="BOOK_BIGRAMS">
  <LIST>
    <!--BIGRAMS THAT WERE SEEN-->
    <P WEIGHT="0.8000">
      <RULEREF NAME="BOOK_A"/>
    </P>
    <!--BACKOFF TO UNIGRAMS-->
    <P WEIGHT="0.2000">
      <RULEREF NAME="UNIGRAMS"/>
    </P>
  </LIST>
</RULE>
<RULE NAME="BOOK_A">
  <LIST>
    <!--ALLOW TERMINATION AT THIS BIGRAM-->
    <P WEIGHT="0.0050">
      <RULEREF NAME="A_LEAF"/>
    </P>
    <!--GO TO TRIGRAMS-->
    <P WEIGHT="0.9950">
      <RULEREF NAME="A_LEAF"/>
```

```xml
      <RULEREF
          NAME="BOOK_A_TRIGRAMS"/>
    </P>
  </LIST>
</RULE>
<RULE NAME="A_BIGRAMS">
  <LIST>
    <!--BIGRAMS THAT WERE SEEN-->
    <P WEIGHT="0.8000">
      <RULEREF NAME="A_TICKET"/>
    </P>
    <!--BACKOFF TO UNIGRAMS-->
    <P WEIGHT="0.2000">
      <RULEREF NAME="UNIGRAMS"/>
    </P>
  </LIST>
</RULE>
<RULE NAME="A_TICKET">
  <LIST>
    <!--ALLOW TERMINATION AT THIS BIGRAM-->
    <P WEIGHT="0.0050">
      <RULEREF NAME="TICKET_LEAF"/>
    </P>
    <!--GO TO TRIGRAMS-->
    <P WEIGHT="0.9950">
      <RULEREF NAME="TICKET_LEAF"/>
      <RULEREF
          NAME="A_TICKET_TRIGRAMS"/>
    </P>
  </LIST>
</RULE>
<RULE NAME="TICKET_BIGRAMS">
  <LIST>
    <!--BIGRAMS THAT WERE SEEN-->
    <P WEIGHT="0.8000">
      <RULEREF NAME="TICKET_FROM"/>
    </P>
    <!--BACKOFF TO UNIGRAMS-->
    <P WEIGHT="0.2000">
      <RULEREF NAME="UNIGRAMS"/
    </P>
  </LIST>
</RULE>
<RULE NAME="TICKET_FROM">
  <LIST>
    <!--ALLOW TERMINATION AT THIS BIGRAM-->
    <P WEIGHT="0.0050">
      <RULEREF NAME="FROM_LEAF"/>
    </P>
    <!--GO TO TRIGRAMS-->
    <P WEIGHT="0.9950">
      <RULEREF NAME="FROM_LEAF"/>
      <RULEREF
          NAME="TICKET_FROM_TRIGRAMS"/>
    </P>
  </LIST>
</RULE>
<RULE NAME="FROM_BIGRAMS">
  <LIST>
    <!--BIGRAMS THAT WERE SEEN-->
    <P WEIGHT="0.8000">
      <RULEREF
          NAME="FROM_CLASSDEF_CITY"/>
    </P>
    <!--BACKOFF TO UNIGRAMS-->
    <P WEIGHT="0.2000">
      <RULEREF NAME="UNIGRAMS"/>
    </P>
  </LIST>
</RULE>
<RULE NAME="FROM_CLASSDEF_CITY">
  <LIST>
    <!--ALLOW TERMINATION AT THIS BIGRAM-->
    <P WEIGHT="0.0050">
      <RULEREF
          NAME="CLASSDEF_CITY_LEAF"/>
    </P>
    <!--GO TO TRIGRAMS-->
    <P WEIGHT="0.9950">
      <RULEREF
          NAME="CLASSDEF_CITY_LEAF"/>
      <RULEREF
          NAME="FROM_CLASSDEF_CITY_TRIGRAMS"/>
    </P>
  </LIST>
</RULE>
<!--Trigram Rules>
<RULE NAME="I_WANT_TRIGRAMS">
  <LIST>
    <!--GO TO SEEN TRIGRAMS-->
    <P WEIGHT="0.8000">
      <RULEREF NAME="I_WANT_TO"/>
    </P>
    <!--BACKOFF TO FLIGHT_BIGRAMS-->
    <P WEIGHT="0.2000">
      <RULEREF NAME="WANT_BIGRAMS"/>
    </P>
  </LIST>
</RULE>
<RULE NAME="I_WANT_TO">
  <LIST>
    <!--ALLOW TERMINATION AT THIS BIGRAM-->
    <P WEIGHT="0.2000">
      <RULEREF NAME="TO_LEAF"/>
    </P>
    <!--GO TO TRIGRAMS-->
    <P WEIGHT="0.8000">
      <RULEREF NAME="TO_LEAF"/>
      <RULEREF
          NAME="WANT_TO_TRIGRAMS"/>
    </P>
  </LIST>
</RULE>
<RULE NAME="WANT_TO_TRIGRAMS">
  <LIST>
    <!--GO TO SEEN TRIGRAMS-->
    <P WEIGHT="0.8000">
      <RULEREF NAME="WANT_TO_FLY"/>
    </P>
    <!--BACKOFF TO TO_BIGRAMS-->
    <P WEIGHT="0.2000">
      <RULEREF NAME="TO_BIGRAMS"/>
    </P>
  </LIST>
</RULE>
<RULE NAME="WANT_TO_FLY">
  <LIST>
    <!--ALLOW TERMINATION AT THIS BIGRAM-->
```

```xml
        <P WEIGHT="0.2000">
            <RULEREF NAME="FLY_LEAF"/>
        </P>
        <!--GO TO TRIGRAMS-->
        <P WEIGHT="0.8000">
            <RULEREF NAME="FLY_LEAF"/>
            <RULEREF NAME="TO_FLY_TRIGRAMS"/>
        </P>
    </LIST>
</RULE>
<RULE NAME="TO_FLY_TRIGRAMS">
    <LIST
        <!--GO TO SEEN TRIGRAMS-->
        <P WEIGHT="0.8000">
            <RULEREF NAME="TO_FLY_TO"/>
        </P>
        <!--BACKOFF TO TO_BIGRAMS-->
        <P WEIGHT="0.2000">
            <RULEREF NAME="FLY_BIGRAMS"/>
        </P>
    </LIST>
</RULE>
<RULE NAME="TO_FLY_TO">
    <LIST>
        <!--ALLOW TERMINATION AT THIS BIGRAM-->
        <P WEIGHT="0.2000">
            <RULEREF NAME="TO_LEAF"/>
        </P>
        <!--GO TO TRIGRAMS-->
        <P WEIGHT="0.8000">
            <RULEREF NAME="TO_LEAF"/>
            <RULEREF NAME="FLY_TO_TRIGRAMS"/>
        </P>
    </LIST>
</RULE>
<RULE NAME="FLY_TO_TRIGRAMS">
    <LIST>
        <!--GO TO SEEN TRIGRAMS-->
        <P WEIGHT="0.8000">
            <RULEREF
                NAME="FLY_TO_CLASSDEF_CITY"/>
        </P>
        <!--BACKOFF TO TO_BIGRAMS-->
        <P WEIGHT="0.2000">
            <RULEREF NAME="TO_BIGRAMS"/>
        </P>
    </LIST>
</RULE>
<RULE NAME="FLY_TO_CLASSDEF_CITY">
    <LIST>
        <!--USE THE UNIGRAM RULE-->
        <P WEIGHT="1.0000">
            <RULEREF NAME="CLASSDEF_CITY"/>
        </P>
    </LIST>
</RULE>
<RULE NAME="PLEASE_BOOK_TRIGRAMS">
    <LIST>
        <!--GO TO SEEN TRIGRAMS-->
        <P WEIGHT="0.8000">
            <RULEREF NAME="PLEASE_BOOK_A"/>
        </P>
        <!--BACKOFF TO TO_BIGRAMS-->
        <P WEIGHT="0.2000">
            <RULEREF NAME="BOOK_BIGRAMS"/>
        </P>
    </LIST>
</RULE>
<RULE NAME="PLEASE_BOOK_A">
    <LIST>
        <!--ALLOW TERMINATION AT THIS BIGRAM-->
        <P WEIGHT="0.2000">
            <RULEREF NAME="A_LEAF"/>
        </P>
        <!--GO TO TRIGRAMS-->
        <P WEIGHT="0.8000">
            <RULEREF NAME="A_LEAF"/>
            <RULEREF
                NAME="BOOK_A_TRIGRAMS"/>
        </P>
    </LIST>
<RULE>
<RULE NAME="BOOK_A_TRIGRAMS">
    <LIST>
        <!--GO TO SEEN TRIGRAMS-->
        <P WEIGHT="0.8000">
            <RULEREF NAME="BOOK_A_TICKET"/>
        </P>
        <!--BACKOFF TO TO_BIGRAMS-->
        <P WEIGHT="0.2000">
            <RULEREF NAME="A_BIGRAMS"/>
        </P>
    </LIST>
</RULE>
<RULE NAME="BOOK_A_TICKET">
    <LIST>
        <!--ALLOW TERMINATION AT THIS BIGRAM-->
        <P WEIGHT="0.2000">
            <RULEREF NAME="TICKET_LEAF"/>
        </P>
        <!--GO TO TRIGRAMS-->
        <P WEIGHT="0.8000">
            <RULEREF NAME="TICKET_LEAF"/>
            <RULEREF
                NAME="A_TICKET_TRIGRAMS"/>
        </P>
    </LIST>
</RULE>
<RULE NAME="A_TICKET_TRIGRAMS">
    <LIST>
        <!--GO TO SEEN TRIGRAMS-->
        <P WEIGHT="0.8000">
            <RULEREF NAME="A_TICKET_FROM"/>
        </P>
        <!--BACKOFF TO TO_BIGRAMS-->
        <P WEIGHT="0.2000">
            <RULEREF NAME="TICKET_BIGRAMS"/>
        </P>
    </LIST>
</RULE>
<RULE NAME="A_TICKET_FROM">
    <LIST>
        <!--ALLOW TERMINATION AT THIS BIGRAM-->
        <P WEIGHT="0.2000">
            <RULEREF NAME="FROM_LEAF"/>
        </P>
        <!--GO TO TRIGRAMS-->
        <P WEIGHT="0.8000">
            <RULEREF NAME="FROM_LEAF"/>
```

```
            <RULEREF
                NAME="TICKET_FROM_TRIGRAMS"/>
        </P>
    </LIST>
</RULE>
<RULE NAME="TICKET_FROM_TRIGRAMS">
    <LIST>
        <!--GO TO SEEN TRIGRAMS-->
        <P WEIGHT="0.8000">
            <RULEREF
                NAME="TICKET_FROM_CLASSDEF_
                CITY"/>
        </P>
        <!--BACKOFF TO TO_BIGRAMS-->
        <P WEIGHT="0.2000">
            <RULEREF NAME="FROM_BIGRAMS"/>
        </P>
    </LIST>
</RULE>
<RULE
    NAME="TICKET_FROM_CLASSDEF_CITY">
    <LIST>
        <!--ALLOW TERMINATION AT THIS BIG-
        RAM-->
        <P WEIGHT="0.2000">
            <RULEREF
                NAME="CLASSDEF_CITY_LEAF"/>
        </P>
        <!--GO TO TRIGRAMS-->
        <P WEIGHT="0.8000">
            <RULEREF
                NAME="CLASSDEF_CITY_LEAF"/>
            <RULEREF
                NAME="FROM_CLASSDEF_CITY_TRI-
                GRAMS"/>
        </P>
    </LIST>
</RULE>
<RULE
    NAME="FROM_CLASSDEF_CITY_TRIGRAMS">
    <LIST>
        <!--GO TO SEEN TRIGRAMS-->
        <P WEIGHT="0.8000">
            <RULEREF
                NAME="FROM_CLASSDEF_CITY TO"/>
        </P>
        <!--BACKOFF TO TO_BIGRAMS-->
        <P WEIGHT="0.2000">
            <RULEREF
                NAME="CLASSDEF_CITY_BIGRAMS"/>
        </P>
    </LIST>
</RULE>
<RULE NAME="FROM_CLASSDEF_CITY_TO">
    <LIST>
        <!--ALLOW TERMINATION AT THIS BIG-
        RAM-->
        <P WEIGHT="0.2000">
            <RULEREF NAME="TO_LEAF"/>
        </P>
        <!--GO TO TRIGRAMS-->
        <P WEIGHT="0.8000">
            <RULEREF NAME="TO_LEAF"/>
            <RULEREF
                NAME="CLASSDEF_CITY_TO_TRI-
                GRAMS"/>
        </P>
    </LIST>
</RULE>
<RULE
    NAME="CLASSDEF_CITY_TO_TRIGRAMS">
    <LIST>
        <!--GO TO SEEN TRIGRAMS-->
        <P WEIGHT="0.8000">
            <RULEREF
                NAME="CLASSDEF_CITY_TO_CLASS-
                DEF_CITY"/>
        </P>
        <!--BACKOFF TO TO_BIGRAMS-->
        <P WEIGHT="0.2000">
            <RULEREF NAME="TO_BIGRAMS"/>
        </P>
    </LIST>
</RULE>
<RULE    NAME="CLASSDEF_CITY_TO_CLASS-
    DEF_CITY">
    <LIST>
        <!--GO TO UNIGRAM-->
        <P WEIGHT="1.0000">
            <RULEREF NAME="CLASSDEF_CITY"/>
        </P>
    </LIST>
</RULE>
</GRAMMAR>
```

Although the present invention has been described with reference to particular embodiments, workers skilled in the art will recognize that changes may be made in form and detail without departing from the spirit and scope of the invention.

What is claimed is:

1. A method of automatically constructing a grammar, the method comprising:
   receiving sentences;
   forming n-grams based on the sentences; and
   a processor automatically generating a rule having a name attribute that identifies the rule in the grammar based in part on the n-grams, wherein generating a rule comprises generating a rule for a specific n-gram by including an entry in the rule to allow the specific n-gram to appear in a position where it did not appear in the sentences.

2. The method of claim 1 wherein forming n-grams comprises:
   receiving at least one class definition comprising a semantic class and at least one text string associated with the semantic class;
   replacing a text string in a sentence with a tag for a semantic class associated with the text string to form a modified sentence; and
   forming n-grams from the modified sentence.

3. The method of claim 1 wherein forming n-grams comprises forming different orders of n-grams.

4. The method of claim 2 wherein generating a rule further comprises generating a separate rule for each specific n-gram found in the modified sentence.

5. The method of claim 1 wherein generating a rule for a specific n-gram further comprises placing an entry in the rule that includes a reference to a rule for the tag or word in the last position of the n-gram followed by a reference to a rule for at least one n+1-gram.

6. The method of claim 5 wherein the reference to a rule for the tag comprises a reference to a rule that lists all words associated with the semantic class of the tag.

7. The method of claim 2 wherein replacing a text string with a tag comprises replacing as many words as possible in the sentence.

8. The method of claim 2 wherein receiving a class definition comprises receiving a reference to a class defined in an existing grammar.

9. A computer-readable storage medium having computer-executable instructions encoded thereon for performing steps comprising:
   receiving a list of text strings associated with a semantic class;
   receiving at least one sentence in which a text string in the list of text strings appears with additional text; and
   generating a grammar in a particular grammar format based on the at least one sentence and the semantic class by:
      selecting the text string from the sentence;
      comparing the text string to text strings that are listed for the semantic class;
      determining that the text string exactly matches a text string listed for the semantic class;
      replacing the text string in the at least one sentence with a tag for the semantic class associated with the text string to form a modified sentence comprising the tag and the additional text where the tag for the semantic class represents the multiple text strings associated with the semantic class;
      forming n-grams using the modified sentence; and
      generating rules for the grammar based on the n-grams.

10. The computer-readable storage medium of claim 9 wherein receiving a text string comprises:
    receiving a text string parameter that identifies the text string;
    receiving a semantic class parameter that identifies the semantic class; and
    receiving a weight parameter that indicates the relative weight to be assigned to the text string in the semantic class.

11. The computer-readable storage medium of claim 9 wherein receiving at least one sentence comprises:
    receiving a sentence parameter that identifies the sentence; and
    receiving a weight parameter that indicates a weight for the sentence in the grammar.

12. The computer-readable storage medium of claim 9 wherein generating a grammar comprises:
    receiving a grammar output file parameter that designates the name to be given to the file containing the grammar; and
    receiving a grammar format parameter that designates the format for the grammar.

13. The computer-readable storage medium of claim 9 further comprising defining a semantic class.

14. The computer-readable storage medium of claim 13 wherein defining the semantic class comprises:
    receiving a main semantic class parameter that provides a main semantic class for the semantic class;
    receiving an indicator semantic class parameter that defines an indicator semantic class for the semantic class;
    receiving an active node parameter that indicates whether the combination of the indicator semantic class and the main semantic class should be used as the default for the main semantic class; and
    defining the semantic class based on the main semantic class parameter, the indicator semantic class parameter and the active node parameter.

15. The computer-readable medium of claim 14 wherein the main semantic class parameter comprises a reference to a semantic class in an external grammar.

16. A method of forming a grammar, the method comprising:
    displaying a user interface that provides a text area for a user to enter sentences representing possible user responses and an area for associating text strings with a semantic class, at least one semantic class being associated with multiple text strings;
    a processor forming modified sentences from the sentences entered through the user interface by performing steps for each sentence entered through the user interface, the steps comprising:
       identifying a group of words in the sentence;
       comparing the group of words to a list of the text strings associated with the semantic class;
       determining that the group of words matches a text string in the list of text strings associated with the semantic class;
       replacing the group of words in the sentences with a tag for a semantic class associated with the text string that matches the group of words while leaving other words in the sentence unchanged to form a modified sentence, the tag representing multiple text strings associated with the semantic class; and
    using the modified sentences to form the grammar.

17. The method of claim 16 further comprising identifying n-grams of a plurality of orders in the modified sentences.

18. The method of claim 17 further comprising forming a separate rule in the grammar for each identified n-gram.

19. The method of claim 16 wherein using the modified sentences to form the grammar comprises providing rules in the grammar for word sequences that were not present in the sentences.

* * * * *